United States Patent
Johnson

(10) Patent No.: US 7,721,021 B2
(45) Date of Patent: May 18, 2010

(54) SAS ZONE GROUP PERMISSION TABLE VERSION IDENTIFIERS

(75) Inventor: Stephen B. Johnson, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 752 days.

(21) Appl. No.: 11/562,189

(22) Filed: Nov. 21, 2006

(65) Prior Publication Data

US 2008/0120687 A1 May 22, 2008

(51) Int. Cl.
G06F 3/00 (2006.01)

(52) U.S. Cl. .......................... 710/36; 710/74; 709/223; 709/225

(58) Field of Classification Search .................. None
See application file for complete search history.

(56) References Cited

U.S. PATENT DOCUMENTS

| | | |
|---|---|---|
| 2005/0125574 A1 | 6/2005 | Foster et al. |
| 2005/0186832 A1 | 8/2005 | Nemazie |
| 2006/0101171 A1 | 5/2006 | Grieff et al. |
| 2006/0155946 A1 | 7/2006 | Ji |
| 2006/0179087 A1 | 8/2006 | Fujii et al. |

OTHER PUBLICATIONS

Liao et al., Managing Access Control Through SAS Zoning, Nov. 20, 2006, http://techon.nikkeibp.co.jp/article/HONSHI/20061120/124030/?ST=english_PRINT, pp. 1-8.*

* cited by examiner

*Primary Examiner*—Eron J Sorrell
(74) *Attorney, Agent, or Firm*—Duft Bornsen & Fishman LLP

(57) ABSTRACT

Apparatus and methods are provided for managing SAS zone group permission tables using associated version identifiers. Zone group permission tables of a SAS domain may have associated version identifiers, indicating a version of the zone group permission table. The version identifier may be used to determine whether the zone group permission table is the same as the current version for the SAS domain without comparing the contents of the zone group permission table with the contents of the current version. The version identifier may also be used for determining which of a plurality of zone group permission tables of the SAS domain is the current version if two or more SAS zoning expanders are storing different zone group permission tables.

22 Claims, 7 Drawing Sheets

SAS ZONE GROUP PERMISSION TABLE VERSION IDENTIFIERS

BACKGROUND

1. Field of the Invention

The invention relates generally to serial attached SCSI ("SAS") domains and more specifically to apparatus and methods using zone group permission table version identifiers for managing zone group permission tables of a SAS domain.

2. Discussion of Related Art

Small Computer Systems Interface ("SCSI") is an American National Standards Institute ("ANSI") standard electronic interface specification that allows, for example, computers to communicate with peripheral hardware. Common SCSI compatible peripheral devices may include storage devices, such as disk drives, tape drives, CD drives ("CD-ROM", "CD-RW", etc), DVD drives, storage subsystems, printers and scanners. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to command subsets common to most devices and command sets that meet the needs of specific device types as well as a variety of interface standards and protocols.

SCSI interface transports and commands are also used to interconnect networks of storage devices with processing devices. For example, serial SCSI transport media and protocols such as SAS as well as Serial Advanced Technology Attachment ("SATA") protocol exchanges may be used in such networks. These applications are often referred to as storage networks. Those skilled in the art are familiar with SAS and SATA standards as well as other SCSI related specifications and standards. Information about such interfaces and commands is generally obtainable at the websites www.t10.org and www.t13.org.

Such SCSI storage networks are often used in large storage systems having a plurality of disk drives that store data for organizations and/or businesses. The network architecture allows storage devices to be physically dispersed in an enterprise while continuing to directly support SCSI commands. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets often via one or more SAS expanders. In general, as is common in all SCSI communications, SAS initiators initiate communications with SAS targets. The expanders expand the number of ports of a SAS network domain used to interconnect SAS initiators and SAS targets (collectively referred to as SAS devices or SAS device controllers).

In general, a SAS initiator directs information to a SAS target device through ports of one or more SAS expanders in the SAS domain. A "port" in SAS terminology is a logical concept. A port may comprise one or more physical links in a SAS domain. Such physical links are often referred to as PHYs in the terminology of SAS domains. A port may use a single PHY or, if the port is configured as a wide port, may use multiple PHYs logically grouped to provide higher bandwidth.

A variety of protocols are defined in the SAS standards, each useful for communications with particular types of devices and/or for particular applications. Serial SCSI Protocol ("SSP") provides a mapping of SCSI exchanges supporting multiple initiators and targets. SATA Tunneled Protocol ("STP") provides a mapping of SATA expanded to support multiple initiators and targets. Serial Management Protocol ("SMP") provides a management protocol. Each protocol defines layers of exchanges including, for example, application layer processing, transport layer processing, and link layer processing. For example, in general, STP is used in communicating with SATA devices coupled to the SAS domain. An STP initiator (e.g., a host system or a SAS expander) exchanges information with an STP target (e.g., a SATA storage device) using the STP link layer. The STP link layer generally encapsulates SATA related exchanges and flow control into SAS domain exchanges. For example, SSP is used in communicating with SCSI devices coupled to the SAS domain. An SSP initiator exchanges information with an SSP target using the SSP link layer, transport layer, etc.

The SAS specifications presently support zoning capabilities within a SAS domain. A SAS zoning expander (e.g., a SAS expander with zoning capabilities) can control whether a particular PHY is permitted to participate in a connection with another particular PHY. This controls whether two SAS devices attached to the SAS zoning expander through the PHYs are able to communicate. This is important for sharing storage resources among multiple servers, and ensuring that each of the servers is blocked from connecting to other servers and associated storage devices of the other servers. SAS zoning expanders and the PHYs are assigned zone groups. Thus, when SAS exchanges are routed through SAS zoning expanders, the SAS zoning expanders may verify that the PHYs (e.g., the SAS devices coupled to the PHYs) are permitted to participate in the connection. Further, the SAS zoning expander may deny the connection if the PHYs are not permitted to participate in the connection.

A SAS domain may additionally comprise a zone manager, which assigns zone groups to PHYs that are capable of participating in connections within the SAS domain. A zone manager may be an application that interacts with components of the SAS domain to manage the permission settings of the SAS domain. Every PHY in a SAS domain, and the associated SAS devices coupled to the PHY, may be assigned to a zone group. As presently practiced according to the SAS specification, there are up to 128 possible zone groups.

To facilitate zoning, each SAS zoning expander stores a zone group permission table that controls whether a connection is allowed between PHYs based on their zone groups. The purpose of the zone group permission table is for each SAS zoning expander to lookup the zone group associated with a source and destination SAS address to see if they have permission to connect to each other. A requested connection between two PHYs is allowed if the zone group permission table indicates that access between the zone group of the source port and the zone group of the destination port is allowed. Otherwise, the connection is rejected with an error.

For zoning to function correctly, all SAS zoning expanders within the SAS domain should have the same zone group permission table. Otherwise, one SAS zoning expander may allow a connection that should be denied based on the zoning permissions of the SAS domain. Thus, a zoning supervisor is provided within a SAS domain that is capable of generating SMP commands for SAS zoning configuration and management. The zoning supervisor may be one of the SAS zoning expanders, or may be a device attached to the SAS domain. One of the SAS zoning expanders may be elected as the SAS zoning expander supervisor based on having the largest SAS address in the topology. The SAS zoning expander supervisor is responsible for propagating zone permission table changes to all SAS zoning expanders in the SAS domain. The purpose of the supervisor is to ensure that all of the other SAS zoning expanders are using the same zone group permission table and to coordinate the update of zone group permission tables within the SAS domain.

To ensure that all SAS zoning expanders are using the same zone group permission table, the supervisor must retrieve the zone group permission table of each SAS zoning expander (e.g., using an SMP report zone permission request) and compare the retrieved zone group permission table with a current version within the supervisor to determine whether each SAS zoning expander is using the same current zone group permission table. A zone table is logically structured as a 128 zone by 128 zone matrix where each element identifies whether the corresponding zone group of the row may connect with the corresponding zone group of the column. Thus the process of the supervisor to read the zone permission table from each other SAS zoning expander requires transmission of (at least) a 128×128 bit zone group permission table from each of the SAS zoning expanders to the supervisor. Additionally, the supervisor must expend time comparing all of the retrieved zone group permission tables with the current version within the supervisor to determine whether all SAS zoning expanders are using the same zone group permission table. If any of the zone group permission tables are different, then the supervisor needs to update the zone group permission table on the SAS zoning expander that is different (e.g., using an SMP configure zone permission request).

It is a problem that this process must be done at least each time a new SAS zoning expander is elected supervisor or when the SAS zoning expanders are reset during test cases. The process may also be done during discovery and when changes are made to the zone group permission table of the SAS domain. The process is slow and resource intensive. There are also no mechanisms in present SAS zone management to determine which zone group permission table is more up to date. There is no information to choose which zone group permission table to use to resolve a conflict in the event that there are multiple conflicting zone group permission tables within the SAS domain. This can lead to incorrect zoning and server security issues. A SAS zoning expander cannot ensure that the zone group permission table is current. Finally, the zoning configuration and synchronization process slows the entire SAS domain discovery and table routing configuration process because I/O presently cannot be allowed to flow through the SAS domain until the zone group permission tables are the same on each SAS zoning expander.

It is evident from the above discussion that a need exists for an improved structure and method for managing zone group permission tables of a SAS domain.

SUMMARY

The present invention solves the above and other problems, thereby advancing the state of the useful arts, by providing apparatus and methods for managing zone group permission tables using version identifiers. According to features and aspects herein, zone group permission tables of a SAS domain are associated with version identifiers, indicating a version of the zone group permission table. A SAS zoning expander supervisor no longer needs to retrieve a zone group permission table from another SAS zoning expander and execute comparison operations to determine whether the SAS zoning expander's zone group permission table is current. Rather, the version identifier may be used to determine whether the zone group permission table is current.

The version identifier is more compact than the entire zone group permission table, and hence less computationally resource intensive. The compact version identifier may be exchanged between two SAS zoning expanders as parameters of existing communications (i.e., fields of an SMP response frame). Further, the version identifier provides means, such as a checksum, for determining whether a particular zone group permission table has become corrupted. In the future, if the number of zone groups supported by the SAS specification changes (e.g., increases to 256 or 512), then the present transmission and comparing process will become more resource intensive, requiring more bandwidth and processing time. Version identifiers would be even more advantageous in terms of bandwidth and computational resources should the number of zone groups supported by the SAS specification increase in the future. Further, the version identifier provides a mechanism to resolve conflicts in the case of conflicting zone group permission tables stored within the SAS domain by indicating which of multiple zone group permission tables is more up to date.

One aspect herein provides a method for managing zone group permission tables of a Serial Attached SCSI (SAS) domain. The method comprises associating a version identifier with a zone group permission table of the SAS domain. The method further comprises determining whether the zone group permission table is current based on the version identifier associated with the zone group permission table.

Another aspect herein provides a method for managing zone group permission tables of a SAS domain. The method comprises storing a version identifier for a zone group permission table of the SAS domain on a first SAS zoning expander. The method further comprises exchanging the version identifier with a second SAS zoning expander to determine whether the first SAS zoning expander and the second SAS zoning expander are storing the same zone group permission table.

Another aspect herein provides a SAS zoning expander enhanced for improved zone permission table management. The SAS zoning expander comprises a zone group permission table for a SAS domain. The SAS zoning expander further comprises a version identifier associated with the zone group permission table. The version identifier identifies a version of the zone group permission table. The SAS zoning expander further comprises a controller adapted to determine whether the zone group permission table is current based on the version identifier associated with the zone group permission table.

BRIEF DESCRIPTION OF THE DRAWINGS

The same reference number represents the same or similar element on all drawings.

DETAILED DESCRIPTION OF THE DRAWINGS

Figure 1:
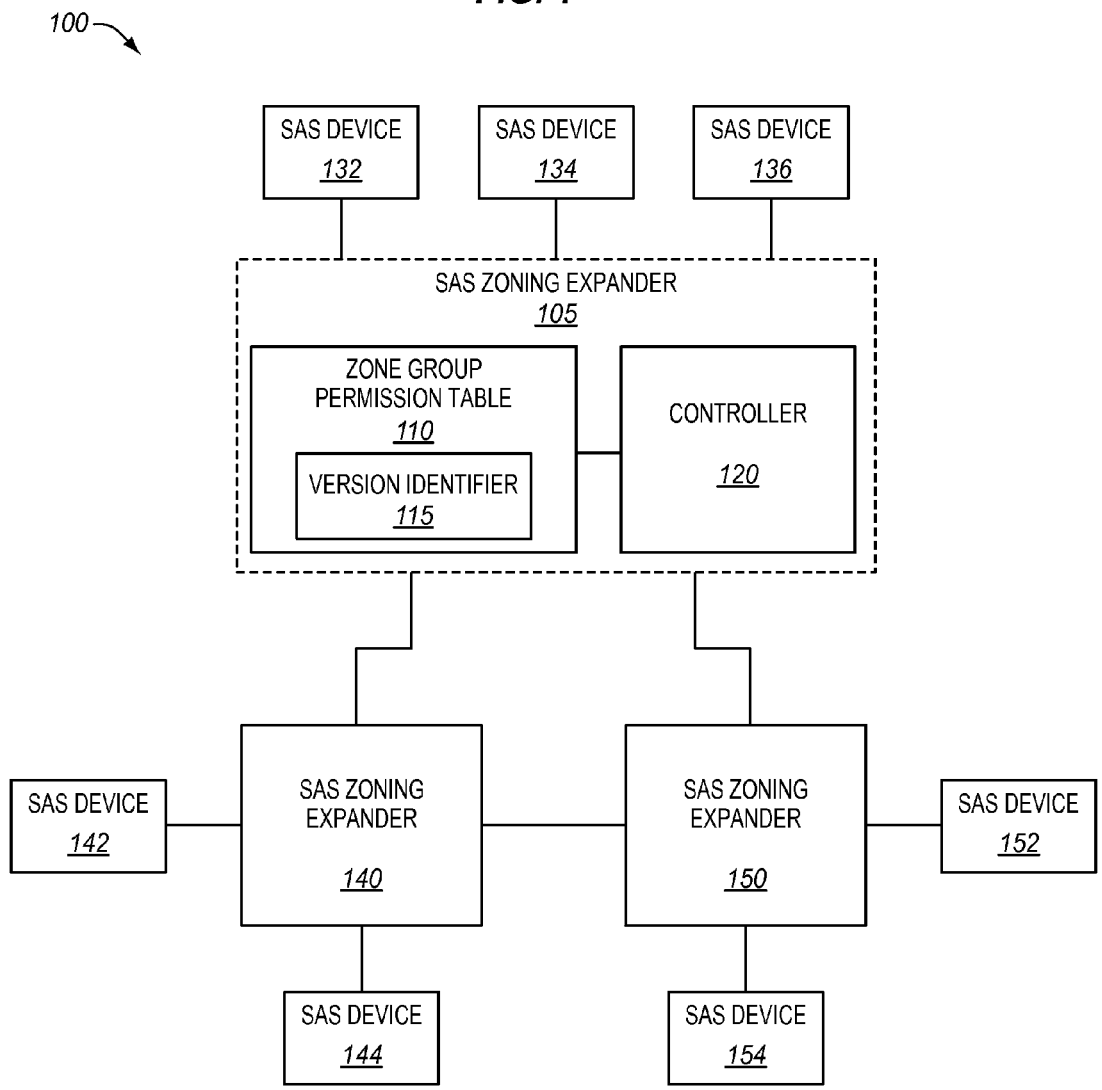
FIG. 1 is a block diagram of an exemplary SAS domain embodying features and aspects herein to provide management of zone group permission tables using version identifiers.

FIG. 1 is a block diagram showing an exemplary SAS domain 100 embodying features and aspects herein. SAS domain 100 comprises a plurality of SAS zoning expanders 105, 140 and 150. Each SAS zoning expander 105, 140 and 150 is coupled to one or more of the other SAS zoning expanders to route SAS exchanges between SAS initiator devices and SAS target devices. Each SAS zoning expander 105, 140 and 150 is additionally coupled to one or more SAS devices 132, 134, 136, 142, 144, 152 and 154. SAS devices may include SAS initiators, SAS targets and SAS initiator/targets. Every SAS device and SAS zoning expander of a SAS domain has one or more physical link layers, known as PHYS. Connections are made between two or more SAS devices through the associated PHYs of the SAS devices. Connections may be routed between SAS devices through one or more SAS zoning expanders.

The SAS zoning expanders 105, 140 and 150 may comprise SAS expanders with zoning capabilities enabled according to the SAS specifications and enhanced with features and aspects herein. PHYs of a SAS zoning expander may be assigned a corresponding zone group, and any SAS devices coupled to the PHY of the SAS zoning expander may be assigned the same SAS zone group.

SAS zoning expander 105 is shown comprising a zone group permission table 110 having an associated version identifier 115. Zone group permission table 110 stores information regarding permissions of a zone group of the SAS domain 100 to communicate with another zone group. A zone group is assigned to one or more PHYs of a zoning expander (e.g., zoning expander 105). Thus, the PHY of SAS zoning expander 105 coupled to SAS device 132 may comprise a zone group, while the PHY connected to SAS device 134 may comprise another zone group. Likewise, both of the PHYs of SAS zoning expander 105 coupled to SAS device 132 and 134 may comprise a single zone group.

SAS zoning expander 105 uses the zone group permission table 110 to determine whether a particular PHY of one zone group has permission to communicate with PHYs of another zone group. Version identifier 115 identifies a version of the zone group permission table 110. Version identifier 115 may comprise, for example, a time stamp, an identifier having ordinal characteristics (e.g., numbers, letters or other ordinal values), a checksum, an address of the zone manager originating the zone group permission table 110, a globally unique identification number or any other type of identifier that may be used to distinguish between two different versions of zone group permission table 110. SAS zoning expander 105 additionally comprises a controller 120 enhanced according to features and aspects herein to provide management of zone group permission table 110 using version identifier 115. SAS zoning expanders 140 and 150 may be configured similarly to SAS zoning expander 105, with each SAS zoning expander comprising a controller, a SAS zone group permission table and a version identifier. SAS zoning expanders 105, 140 and 150 may comprises other elements well know to those of ordinary skill in the art and not shown for the sake of brevity of this discussion.

The SAS specifications require that for zoning to function properly, all SAS zoning expanders of a SAS domain need to utilize the same zone group permission table. Thus, if at least one SAS zoning expander is using a different zone group permission table than another SAS zoning expander, then all of the SAS zoning expanders need to synchronize their zone group permission tables before SAS exchanges may continue between PHYs of each SAS zoning expander. When the zone group permission tables of all of the SAS zoning expanders are synchronized, all SAS zoning expanders should be storing the current version of the zone group permission table for the SAS domain. Thus, a SAS zoning expander should always be able to determine whether its stored zone group permission table is current for the SAS domain.

Figure 2:
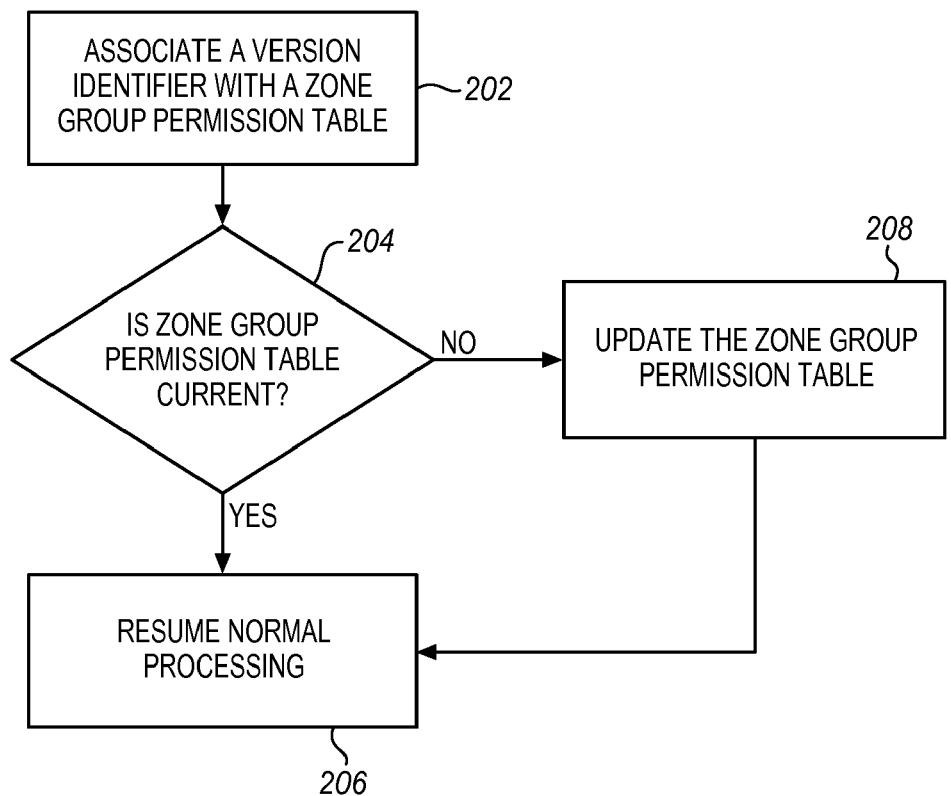
FIG. 2 is a flowchart describing an exemplary method in accordance with features and aspects herein to provide management of zone group permission tables of a SAS domain.

FIG. 2 is a flowchart illustrating an exemplary method in accordance with features and aspects herein operable for managing zone group permission tables of a SAS domain. Element 202 is operable to associate a version identifier with a zone group permission table of the SAS domain. For example, the zone group permission table of the SAS domain may be stored on a SAS zoning expander. The version identifier may be associated with the zone group permission table when the zone group permission table is first stored onto a SAS zoning expander of the SAS domain. A zone group permission table may be stored on a SAS zoning expander as part of an SMP configure zone permission request. The request may include the associated version identifier for the zone group permission table configured on the SAS zoning expander. Once the SAS zoning expander receives the request, the SAS zoning expander may store both the zone group permission table (e.g., zone group permission table 110) and associated version identifier (e.g., version identifier 115) for future use during operation within the SAS domain.

Element 204 is operable to determine whether the zone group permission table is current based on the version identifier associated with the zone group permission table. For example, a current version identifier of a current version of the zone group permission table for the SAS domain may be received by a first SAS zoning expander from a second SAS zoning expander. The current version identifier of the second SAS zoning expander may be compared with the version identifier of the first SAS zoning expander to determine whether the zone group permission table of the first SAS zoning expander is current.

If the zone group permission table for the SAS domain is determined to be current by element 204, then element 206 is operable to resume normal processing.

Otherwise, if the zone group permission table is determined to not be current by element 204, then element 208 is operable to update the zone group permission table to the current version. For example, a SAS zoning expander storing the zone group permission table that is not current for the SAS domain may query another device (e.g., the SAS zoning expander supervisor) known to store the current version of the zone group permission table for the SAS domain. The SAS zoning expander may then update the zone group permission table to correspond to the current version received from the SAS zoning expander supervisor.

Using features and aspects herein, a SAS device (e.g., a SAS zoning expander) may determine whether a zone group permission table is current using a single comparison of two version identifiers rather than comparing the contents of two zone group permission tables to determine whether each value of the two zone group permission tables are the same. This eliminates transmitting entire zone group permission tables from SAS zoning expanders to a SAS zoning expander supervisor, which consumes bandwidth of the SAS domain. Additionally, this eliminates the centralized comparisons that the SAS zoning expander supervisor needs to execute to determine whether a SAS zoning expander is using a current zone group permission table. Rather, in accordance with features and aspects herein, a SAS zoning expander or any other SAS device or component (e.g., a SAS zone manager) may determine whether its zone group permission table is current without the assistance of the SAS zoning expander supervisor.

Figure 3:
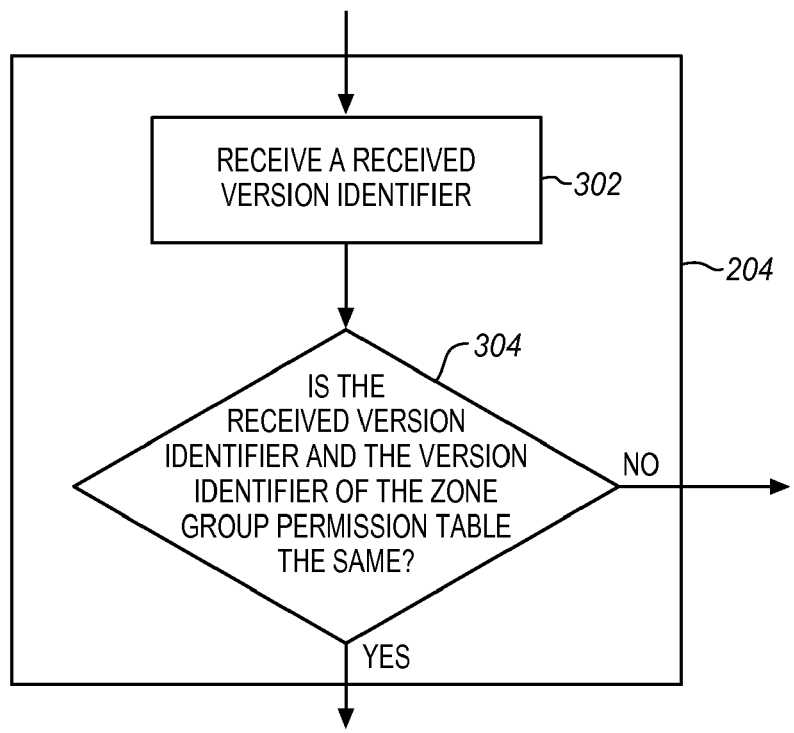
FIG. 3 is flowchart describing exemplary additional details of aspects of the method of FIG. 2.

FIG. 3 is a flowchart providing additional details of an exemplary embodiment of features and aspects herein to permit a SAS zoning expander to determine whether its zone group permission table is the same as the zone group permission table of another SAS device (e.g., another SAS zoning expander). FIG. 3 provides additional exemplary details of the processing of element 204 of FIG. 2. As noted above, element 204 is generally operable to determine whether a zone group permission table is current. If two SAS zoning expanders are using different zone group permission tables, then at least one of the zone group permission tables is not current for the SAS domain. Using characteristics of version identifiers of the two SAS zoning expanders, one or both of the SAS zoning expanders may determine which of the two different zone group permission tables is a more recent version or the current version of the zone group permission table.

Element 302 is operable within a SAS zoning expander storing a zone group permission table to receive a received version identifier from a second SAS zoning expander. The second SAS zoning expander may store a stored zone group permission table, and the received version identifier may identify a version of the stored zone group permission table of the second SAS zoning expander. The received version identifier is used by the SAS zoning expander to determine whether its own zone group permission table is the same.

Element 304 is operable to compare the received version identifier from the second SAS zoning expander with the version identifier associated with the zone group permission table of the SAS zoning expander. By comparing the version identifier with the received version identifier, the SAS zoning expander may determine whether the version identifier of its zone group permission table is the same as the received version identifier of the SAS device. If the version identifiers are different, then the SAS device and the SAS zoning expander are using different zone group permission tables, and at least one of the zone group permission tables is not current.

The version identifier and received version identifier may additionally comprise a check sum exchanged between two devices (e.g., SAS zoning expanders) of the SAS domain. The checksum may be exchanged between the two SAS zoning expanders to determine whether the zone group permission tables of the two SAS zoning expanders are the same. The checksum comparison may also be used to determine whether one or both of the zone group permission tables has become corrupted or is otherwise incomplete.

The method described in FIG. 3 may utilize existing resources and communications of a SAS domain. For example, SAS zoning expanders may exchange version identifiers in SMP report general and SMP discovery requests and responses. SMP report general and SMP discovery requests and responses are defined by the SAS specifications, and are used by one SAS component (e.g., a SAS zoning expander) to determine information regarding another SAS component (e.g., another SAS zoning expander). For example, the version identifier may be exchanged in a vendor unique field of any request and response communication between SAS devices or SAS zoning expanders. Thus, a SAS zoning expander may determine during discovery, as well as during normal management operations, whether its zone group permission table is the same as zone group permission tables of other SAS zoning expanders. This comparison process ensures that the zone group permission tables of all of the SAS zoning expanders are current, because if any two SAS zoning expanders have different zone group permission tables, then at least one will not be current, and corrective action can be used to update the zone group permission table that is not current.

Figure 4:
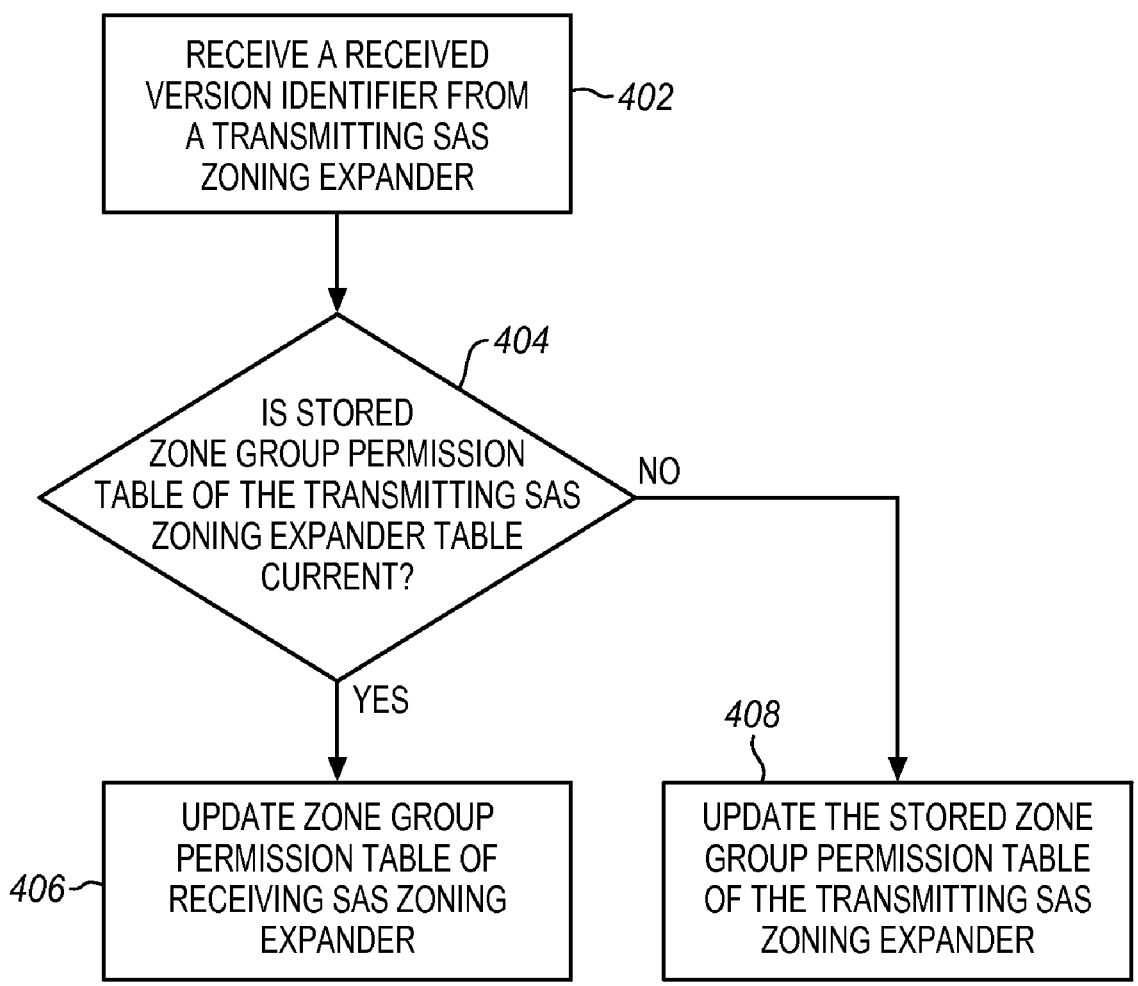
FIG. 4 is a flowchart describing another exemplary method in accordance with features and aspects herein to provide management of zone group permission tables of a SAS domain.

FIG. 4 is a flowchart of another exemplary method to permit a SAS zoning expander to determine whether its zone group permission table is current as compared to a zone group permission table of another SAS device (e.g., a SAS zoning expander).

Element 402 is operable to receive a received version identifier from a transmitting SAS zoning expander. The transmitting SAS zoning expander may store a stored zone group permission table, and the received version identifier may identify a version of the stored zone group permission table of the transmitting SAS zoning expander. The received version identifier is used by the receiving SAS zoning expander to determine whether its own zone group permission table is the same.

Element 404 is operable by the receiving SAS zoning expander to determine whether the stored zone group permission table of the transmitting SAS zoning expander is current. Element 404 operates to compare the received version identifier from the transmitting SAS zoning expander with the version identifier of the receiving SAS zoning expander to determine which is more recent given characteristics of the version identifier and the received version identifier.

If the version identifier and received version identifier possess ordinal characteristics, such as a timestamp or version number, then the receiving SAS zoning expander may determine which zone group permission table is current—e.g., the table corresponding to the version identifier of the receiving expander or the table corresponding to the received version identifier from the transmitting expander.

For example, if the received version identifier from the transmitting SAS zoning expander has a later time stamp than the version identifier of the receiving SAS zoning expander, then the receiving SAS zoning expander may determine that its zone group permission table is not current. Likewise, if the received version identifier has an earlier time stamp than the version identifier, then the receiving SAS zoning expander may determine that its zone group permission table is current because it has a later version identifier associated with it. The transmitting SAS zoning expander and the receiving SAS zoning expander may then synchronize their respective zone group permission tables so that both are the same, and thus, both current.

If the stored zone group permission table of the transmitting SAS zoning expander is current, then element 406 updates the zone group permission table of the receiving SAS zoning expander. For example, the receiving SAS zoning expander may notify the transmitting SAS zoning expander of the inconsistency of the zone group permission tables, and may further request a copy of the stored zone group permission table from the transmitting SAS zoning expander. The receiving SAS zoning expander may then use the copy of the stored zone group permission table to update its zone group permission table. Once operation of element 406 is complete, then both SAS zoning expanders will have synchronized zone group permission tables and version identifiers.

If the stored zone group permission table is not current, then element 408 is operable to update the stored zone group permission table of the transmitting SAS zoning expander. For example, the receiving SAS zoning expander may notify the transmitting SAS zoning expander of the inconsistency between the zone group permission tables, and may further transmit a copy of the zone group permission table to the transmitting SAS zoning expander. In another embodiment, the transmitting SAS zoning expander may request a copy of the zone group permission table from the receiving SAS zoning expander upon notification of the inconsistency of the zone group permission tables. The transmitting SAS zoning expander may then use the copy of the zone group permission table to update its stored zone group permission table. Once operation of element 408 is complete, the SAS zoning expanders may have synchronized zone group permission tables and version identifiers.

If the version identifier does not comprise ordinal or other characteristics that allow two SAS zoning expanders to determine which of two different versions of zone group permission tables are current, then the two SAS zoning expanders may not be able to synchronize their differing zone group permission tables. At this point, it may not be desirable for communications to pass between PHYs of one SAS zoning expander to PHYs of another SAS zoning expander. For security reasons, it may be beneficial to suspend SAS exchanges (e.g., non management communications such as those using the SSP or STP protocols) between the two SAS zoning expanders until the zone group permission tables are synchronized and current. Otherwise, un-permitted access between PHYs (e.g., SAS devices) may occur.

Figure 5:
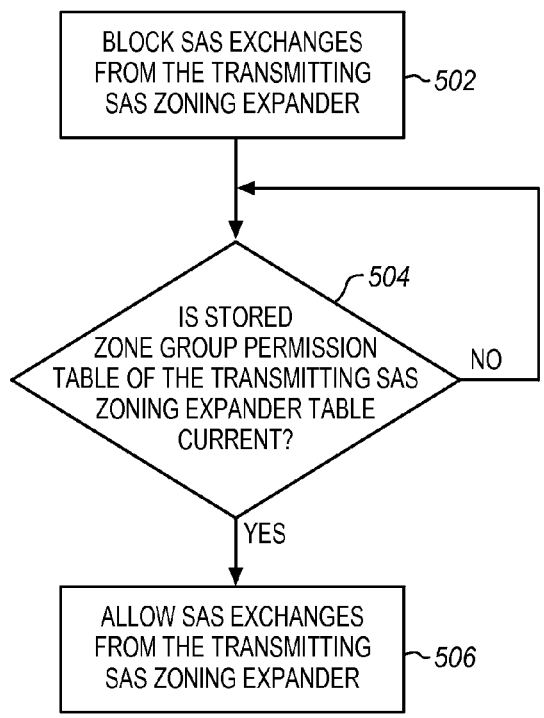
FIG. 5 is a flowchart describing another exemplary method in accordance with features and aspects herein to provide management of zone group permission tables of a SAS domain.

FIG. 5 is a flowchart of another exemplary method to permit a SAS zoning expander (e.g., a blocking SAS zoning expander) to block SAS exchanges with another SAS zoning expander (e.g., a blocked SAS zoning expander) having a different zone group permission table from that of the blocking SAS zoning expander.

Element 502 is operable to block SAS exchanges from a blocked SAS zoning expander to the blocking SAS zoning expander in response to determining that the blocked SAS zoning expander and the blocking SAS zoning expander are using different versions of zone group permission tables for the SAS domain. SAS exchanges may be blocked until the zone group permission table of the blocking SAS zoning expander corresponds to the stored zone group permission table of the blocked SAS zoning expander. Management exchanges (e.g., using the SMP protocol) between the SAS zoning expanders may be allowed, for example to determine when the two SAS zoning expanders are using the same zone group permission table. However, SAS exchanges between SAS devices attached to the SAS zoning expanders may be blocked for security reasons until the mismatching zone group permission tables are resolved. The blocking SAS zoning expander may additionally notify the blocked SAS zoning expander of the inconsistency between the zone group permission tables. Likewise, the blocked SAS zoning expander may block SAS exchanges between the two SAS zoning expanders until the zone group permission tables are synchronized.

Element 504 is operable to determine whether the blocking SAS zoning expander and the blocked SAS zoning expander are using the same zone group permission table. This may be determined for example by an SMP report general request and response comprising the received version identifier of the blocked SAS zoning expander. By comparing the received version identifier of the blocked SAS zoning expander and the version identifier of the blocking SAS zoning expander, the blocking SAS zoning expander may determine whether both SAS zoning expanders are using the same zone group permission table. Likewise, the SMP report general exchange allows the blocked SAS zoning expander to make the same determination by comparing the same two values, i.e., the version identifier and the received version identifier.

In one exemplary embodiment, the blocking SAS zoning expander may transmit an SMP report general request to the SAS zoning expander supervisor to determine the current version of the zone group permission table for the SAS domain. A SAS zoning expander supervisor is a SAS zoning expander that is "elected" by the other SAS zoning expanders to perform zoning management functions (e.g., ensuring that all zone group permission tables are synchronized within the SAS domain). The SAS zoning expander supervisor may respond to the SMP report general request with an SMP report general response that identifies the current version identifier for the current version of the zone group permission table for the SAS domain. If the blocking SAS zoning expander determines that its zone group permission table is not current, then the blocking SAS zoning expander may synchronize its zone group permission table with the SAS zoning expander supervisor, and then repeat processing of element 504 to determine whether the blocked SAS zoning expander and blocking SAS zoning expander are now using the same zone group permission table.

If the zone group permission table of the blocking SAS zoning expander is current, then the blocking SAS zoning expander may wait for the blocked SAS zoning expander to begin using the current version of the zone group permission table before allowing SAS exchanges to proceed between the two SAS zoning expanders. In the mean time, the blocking SAS zoning expander may process exchanges from other SAS zoning expanders.

In another exemplary embodiment, the blocking SAS zoning expander may continue to transmit periodic requests to the blocked SAS zoning expander to determine whether the stored zone group permission table of the blocked SAS zoning expander has become current. For example, this may be done with an SMP report general request comprising the version identifier transmitted by the blocking SAS zoning expander to the blocked SAS zoning expander. The blocked SAS zoning expander may likewise respond with an SMP report general response comprising the stored version identifier for its stored zone group permission table. The blocking SAS zoning expander may then determine whether the stored zone group permission table of the blocked SAS zoning expander and its own zone group permission table are the same, and therefore both current.

Once the blocking SAS zoning expander determines that the stored zone group permission table of the blocked SAS zoning expander and its own zone group permission table are the same, then element 506 is operable to resume allowing SAS exchanges between the two SAS zoning expanders. Otherwise, element 504 is operable to continue periodically checking to determine whether the stored zone group permission table and the zone group permission table are the same. In another exemplary embodiment, processing of element 504 may operate upon an event, such as a request for communication between a SAS device coupled to the blocking SAS zoning expander and a SAS device coupled to the blocked SAS zoning expander.

Those of ordinary skill in the art will recognize that the various embodiments exemplified with respect to FIG. 5 may be executed by either SAS zoning expander. Communications between the two SAS zoning expanders may establish an inconsistency between the stored zone group permission table and the zone group permission table. One or both of the SAS zoning expanders may decide to block SAS exchanges until the inconsistency is eliminated. Likewise, either device may operate to determine whether its zone group permission table is more current, and to determine whether the inconsistency has been eliminated.

Figure 6:
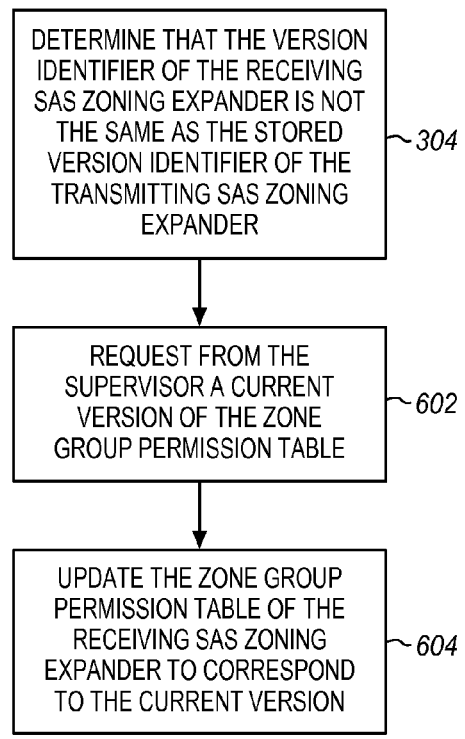
FIGS. 6-8 are flowcharts describing exemplary additional details of aspects of the method of FIG. 2.

FIG. 6 is a flowchart of another exemplary method to permit a SAS zoning expander to communicate with a SAS zoning expander supervisor to obtain a current version of the zone group permission table.

As noted above, element 304 is operable to compare a received version identifier from a transmitting SAS zone expander with the version identifier to determine whether two SAS zoning expanders are using the same zone group permission table. In the event that the stored zone group permission table of the transmitting SAS zoning expander is different than the zone group permission table of the receiving SAS zoning expander, it may be beneficial for one or both of the devices to synchronize its zone group permission table with the SAS zoning expander supervisor. For example, even if ordinal characteristics determine which of the zone group permission table and stored zone group permission table is current, it still may be desirable to make sure that either SAS zoning expander is using the current zone group permission table of the SAS domain.

Element 602 is operable to request from the SAS zoning expander supervisor a current version of the zone group permission table of the SAS domain.

In one exemplary embodiment of element 602, the receiving SAS zoning expander may query the SAS zoning expander supervisor for the current version identifier of the current zone group permission table of the SAS domain. This may be done for example using an SMP report general request to the SAS zoning expander supervisor. In response, the SAS zoning expander supervisor may transmit an SMP report general response comprising the current version identifier for the current zone group permission table of the SAS domain. The receiving SAS zoning expander may then determine whether an update to its zone group permission table is necessary.

If an update of the zone group permission table of the receiving SAS zoning expander is necessary, then element 604 is operable to update the zone group permission table to correspond to the current version. In one exemplary embodiment, this may be done using an SMP configure zone request from the SAS zoning expander supervisor to the SAS zoning expander. The process described with reference to FIG. 6 may additionally be executed by the transmitting SAS zoning expander upon notification that its stored zone group permission table is different than the zone group permission table of the receiving SAS zoning expander.

Figure 7:
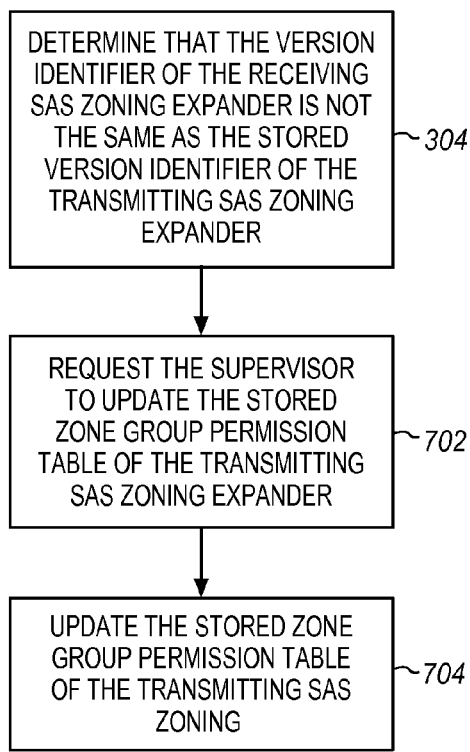

FIG. 7 is a flowchart of another exemplary method to permit a SAS zoning expander to communicate to a SAS zoning expander supervisor that the stored zone group permission table of a transmitting SAS zoning expander needs updating.

As noted above, element 304 is operable to compare a received version identifier from the transmitting SAS zoning expander with the version identifier to determine whether two SAS zoning expanders are using the same zone group permission table. In the event that the stored zone group permission table of the transmitting SAS zoning expander is different than the zone group permission table of the receiving SAS zoning expander, it may be necessary to update the stored zone group permission table of the transmitting SAS zoning expander. For example, the receiving SAS zoning expander may determine that its zone group permission table is more current than the stored zone group permission table of the transmitting SAS zoning expander, and the stored zone group permission table needs updating accordingly.

Element 702 is operable to request the SAS zoning expander supervisor to update the stored zone group permission table of the transmitting SAS zoning expander.

Element 704 is operable to update the stored zone group permission table of the transmitting SAS zoning expander to correspond to a current version of the zone group permission table stored within the SAS zoning expander supervisor. In one exemplary embodiment, this may be done using an SMP configure zone request from the SAS zoning expander supervisor to the transmitting SAS zoning expander. Thus, both of the SAS zoning expanders may then store the same version of the zone group permission table as the SAS zoning expander supervisor.

In some situations, a SAS zoning expander may store a plurality of zone group permission tables, each having a unique version identifier. It may then become necessary to choose one of the plurality of zone group permission tables for use by the SAS zoning expander. For example, a SAS zoning expander supervisor or other SAS device may transmit a zone group permission table to the SAS zoning expander for future use. In another embodiment, the SAS zoning expander may store a plurality of zone group permission tables for use with different SAS domains that the SAS zoning expander is swapped between. In another embodiment, the SAS domain may often change between multiple versions of the zone group permission tables, and the SAS zoning expander may store the multiple versions for later use rather than receiving a copy of the new version each time a change is made. The version identifier provides a means for selecting among the plurality of zone group permission tables.

Figure 8:
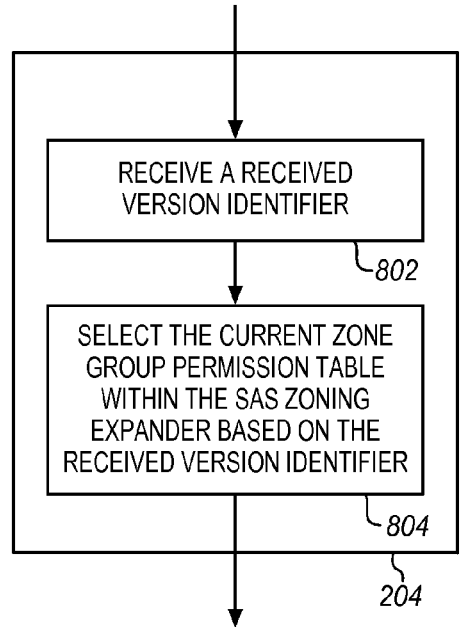

FIG. 8 is a flowchart providing additional details of an exemplary embodiment of features and aspects herein to permit a SAS zoning expander to select a zone group permission table from a plurality of zone group permission tables. FIG. 8 provides additional exemplary details of the processing of element 204 of FIG. 2. As noted above, element 204 is generally operable to determine whether the zone group permission table is current based on the version identifier associated with the zone group permission table.

Element 802 is operable to receive a received version identifier. The received version identifier identifies the current zone group permission table of the SAS domain. For example, a SAS zoning expander supervisor may transmit the received version identifier to the SAS zoning expander. Likewise, the received version identifier may come from other SAS devices responsible for configuring the zone group permission table of the SAS zoning expander.

Element 804 is operable to select the current zone group permission table within the SAS zoning expander by matching the received version identifier with a corresponding version identifier of one of the plurality of zone group permission tables. Once the desired zone group permission table is selected, the zone group permission table of the SAS zoning expander will be current. If the desired zone group permission table is not located, then the SAS zoning expander may notify another SAS device, for example the SAS zoning expander supervisor of the problem, and may obtain a copy of the desired zone group permission table (e.g., the current version).

Figure 9:
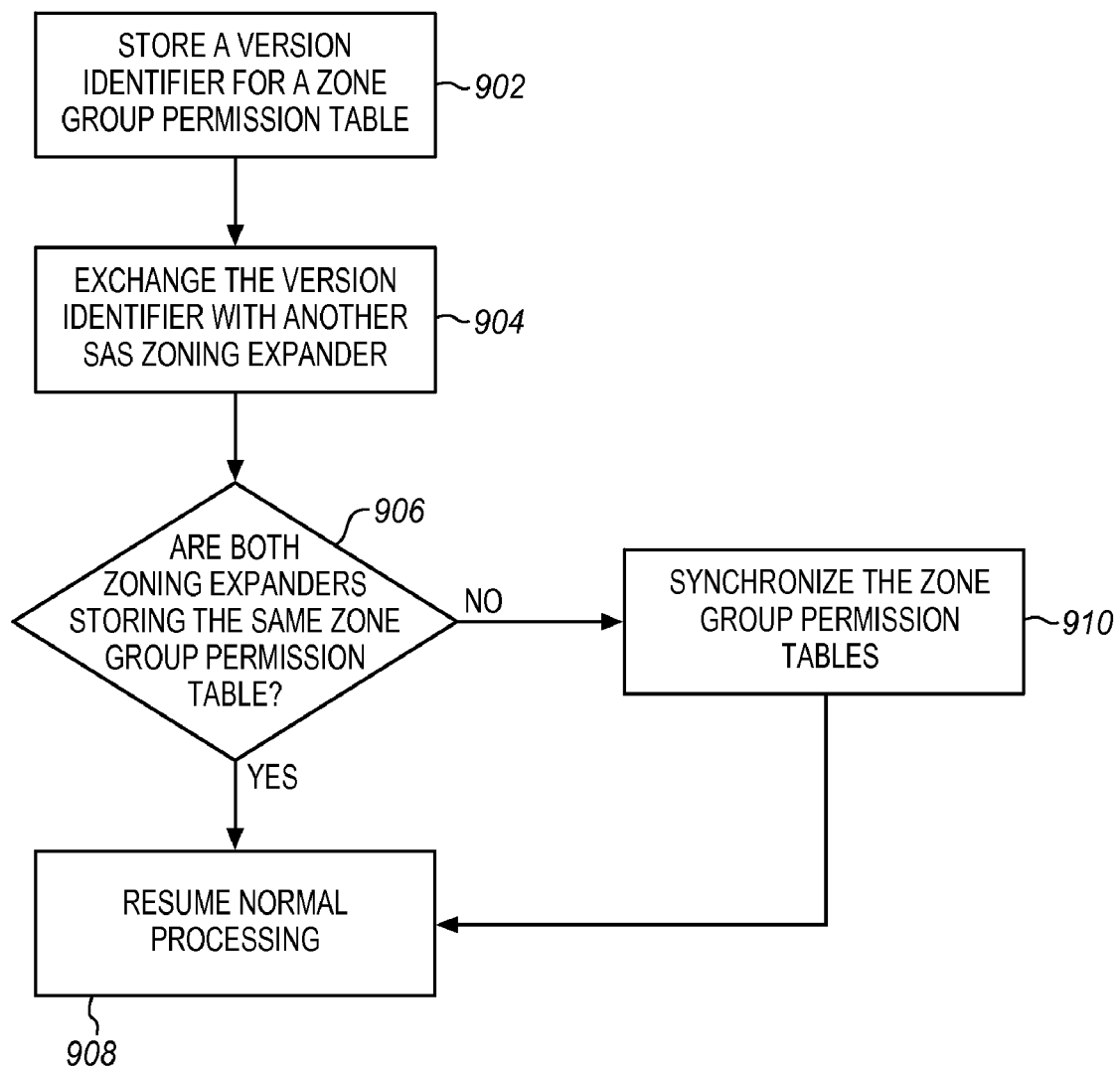
FIG. 9 is a flowchart describing another exemplary method in accordance with features and aspects herein to provide management of zone group permission tables of a SAS domain.
Figure 10:
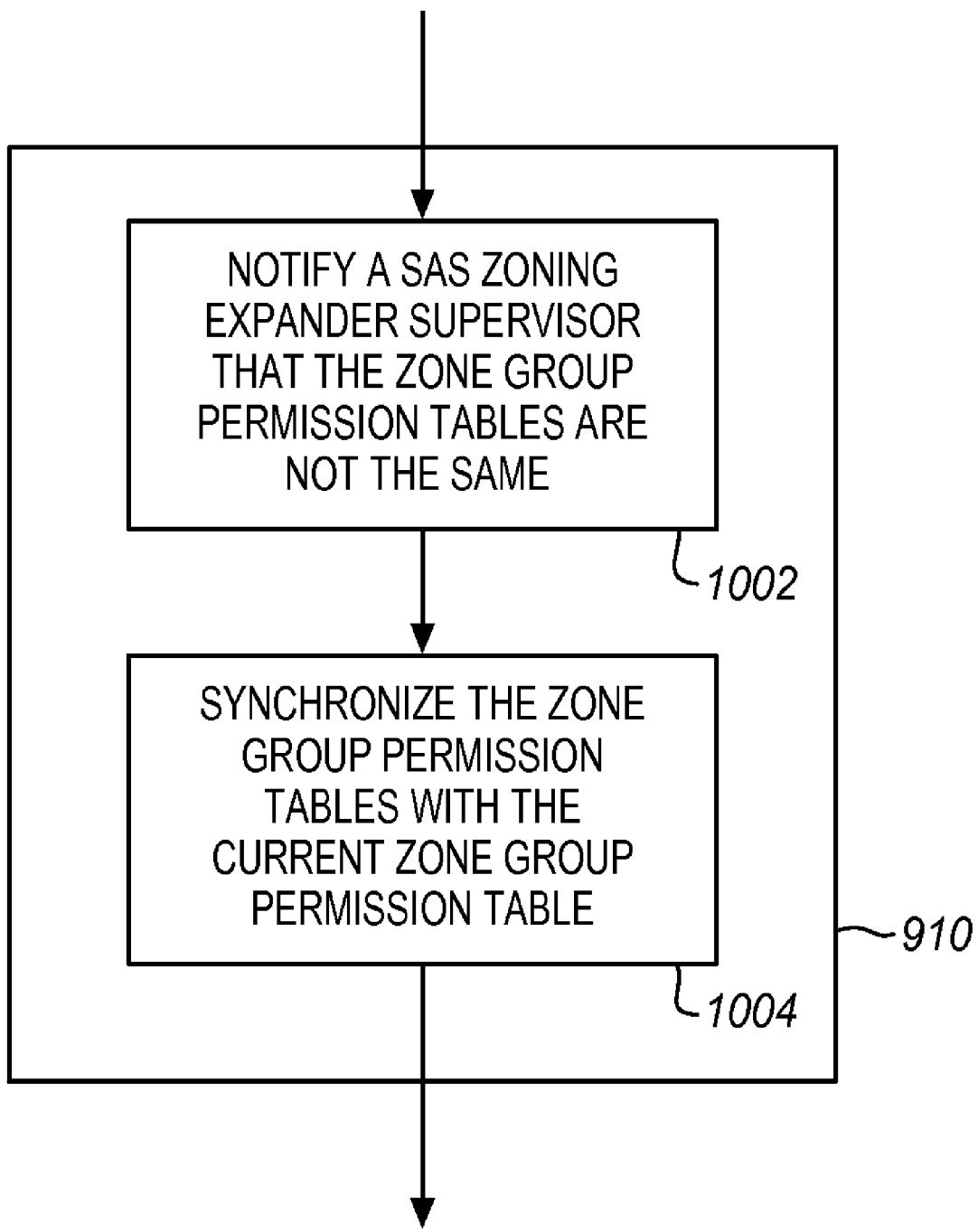
FIG. 10 is a flowchart describing exemplary additional details of aspects of the method of FIG. 9.

FIG. 9 is a flowchart illustrating another exemplary method in accordance with features and aspects herein operable for managing zone group permission tables of a SAS domain. Element 902 is operable to store a version identifier for a zone group permission table of the SAS domain on a first SAS zoning expander.

Element 904 is operable to exchange the version identifier of the first SAS zoning expander with a second SAS zoning expander to determine whether the first SAS zoning expander and the second SAS zoning expander are storing the same zone group permission table.

Element 906 is operable to determine whether the stored zone group permission table of the second SAS zoning expander and the zone group permission table of the first SAS zoning expander are the same. This may be accomplished by comparing the version identifier of the first SAS zoning expander with another version identifier of the second SAS zoning expander. If the version identifiers are different, then the associated zone group permission tables are different. If the stored zone group permission table of the second SAS zoning expander and the zone group permission table of the first SAS zoning expander are not the same, then at least one of the SAS zoning expanders is not storing a current version of the zone group permission table of the SAS domain.

If operation of element 906 determines that the zone group permission tables are the same, then normal processing is resumed in element 908.

Otherwise, if operation of element 906 determines that the zone group permission tables are different, then element 910 is operable to synchronize the zone group permission tables. In one embodiment, the first and second SAS zoning expanders may determine which of the zone group permission tables are current using ordinal characteristics of the version identifiers. For example, the version identifiers may comprise time stamps. Once the current version is identified, then the first and second SAS zoning expanders may exchange the current zone group permission table to synchronize the zone group permission tables of both SAS zoning expanders.

In another embodiment, the first or second SAS zoning expander may notify the SAS zoning expander supervisor that the zone group permission table is not the same as a stored zone group permission table within the second SAS zoning expander. The SAS zoning expander supervisor may then operate to synchronize the zone group permission table and stored zone group permission table to correspond to a current zone group permission table stored within the SAS zoning expander supervisor. The SAS zoning expander supervisor may also wait for operator intervention to resolve the mismatch.

While the invention has been illustrated and described in the drawings and foregoing description, such illustration and description is to be considered as exemplary and not restrictive in character. One embodiment of the invention and minor variants therein have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects herein may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method operable in Serial Attached SCSI (SAS) expander of a SAS domain for managing zone group permission tables of a SAS domain, method the comprising:
    associating a version identifier with a zone group permission table of the SAS domain wherein the version identifier indicates a version for the entire zone group permission table; and
    determining whether the zone group permission table is current based on the version identifier associated with the zone group permission table.

2. The method of claim 1, wherein the version identifier and the zone group permission table are stored on a SAS zoning expander of the SAS domain, and wherein the determining step further comprises:
    receiving a received version identifier; and
    comparing the received version identifier with the version identifier of the SAS zoning expander to determine whether the zone group permission table is current.

3. The method of claim 1, wherein the version identifier and the zone group permission table are stored on a SAS zoning expander of the SAS domain, and wherein the determining step further comprises:
    receiving a received version identifier from a transmitting SAS zoning expander of the SAS domain, wherein the received version identifier is associated with a stored zone group permission table within the transmitting SAS zoning expander; and
    comparing the version identifier of the SAS zoning expander with the received version identifier of the transmitting SAS zoning expander to determine whether the version identifier is the same as the received version identifier.

4. The method of claim 3 wherein the step of comparing determines that the version identifier is not the same as the received version identifier and the comparing step further comprises:
    determining which of the stored zone group permission table of the transmitting SAS zoning expander and the zone group permission table of the SAS zoning expander is current based on ordinal characteristics of the received version identifier and the version identifier.

5. The method of claim 4 further comprising:
    synchronizing the stored zone group permission table of the transmitting SAS zoning expander and the zone group permission of the SAS zoning expander table so that both are current.

6. The method of claim 3 wherein the step of comparing determines that the version identifier is not the same as the received version identifier and the method further comprises:
    blocking SAS exchanges from the transmitting SAS zoning expander to the SAS zoning expander until the zone group permission table of the SAS zoning expander corresponds to the stored zone group permission table of the transmitting SAS zoning expander.

7. The method of claim 3 wherein the step of comparing determines that the version identifier is not the same as the stored version identifier and the method further comprises:
    requesting from a SAS zoning expander supervisor a current version of the zone group permission table for the SAS domain; and
    updating the zone group permission table of the SAS zoning expander to correspond to the current version of the zone group permission table received from the SAS zoning expander supervisor.

8. The method of claim 3 wherein the step of comparing determines that the version identifier is not the same as the stored version identifier and the method further comprises:
   requesting a SAS zoning expander supervisor to update the stored zone group permission table of the transmitting SAS zoning expander; and
   updating the stored zone group permission table.

9. The method of claim 1 wherein the version identifier comprises a time stamp.

10. The method of claim 1 wherein the version identifier comprises a check sum.

11. The method of claim 1 wherein a SAS zoning expander of the SAS domain stores a plurality of zone group permission tables and the determining step further comprises:
   receiving a received version identifier within the SAS zoning expander, wherein the received version identifier identifies the current zone group permission table of the SAS domain; and
   selecting one of the plurality of zone group permission tables for use by the SAS zoning expander by matching the received version identifier with a corresponding version identifier of one of the plurality of zone group permission tables, wherein the selected one of the plurality of zone group permission tables is current for the SAS domain.

12. A method operable Serial Attached SCSI (SAS) expanders of a SAS domain for managing zone group permission tables of a SAS domain, the method comprising:
   storing a version identifier for a zone group permission table of the SAS domain on a first SAS zoning expander wherein the version identifier indicates a version for the entire zone group permission table; and
   exchanging the version identifier with a second SAS zoning expander to determine whether the first SAS zoning expander and the second SAS zoning expander are storing the same zone group permission table.

13. The method of claim 12 wherein the version identifier comprises a time stamp.

14. The method of claim 12 wherein the version identifier comprises a check sum.

15. The method of claim 12 wherein the first SAS zoning expander and the second SAS zoning expander are storing different zone group permission tables, and the method further comprises:
   notifying a SAS zoning expander supervisor that the zone group permission table of the first SAS zoning expander is not the same as a stored zone group permission table of the second SAS zoning expander; and
   synchronizing the zone group permission table of the first SAS zoning expander and the stored zone group permission table of the second SAS zoning expander to correspond to a current zone group permission table stored within the SAS zoning expander supervisor.

16. A Serial Attached SCSI (SAS) zoning expander comprising:
   a zone group permission table for a SAS domain;
   a version identifier associated with the zone group permission table, wherein the version identifier indicates a version of the entire zone group permission table; and
   a controller adapted to determine whether the zone group permission table is current based on the version identifier associated with the zone group permission table.

17. The SAS zoning expander of claim 16 wherein the controller is further adapted to receive a received version identifier and compare the received version identifier with the version identifier of the SAS zoning expander to determine whether the zone group permission table is current.

18. The SAS zoning expander of claim 16 wherein the controller is further adapted to receive a received version identifier from a transmitting SAS zoning expander of the SAS domain, wherein the received version identifier is associated with a stored zone group permission table within the transmitting SAS zoning expander, and the controller is further adapted to compare the version identifier of the SAS zoning expander with the received version identifier of the transmitting SAS zoning expander to determine whether the version identifier is the same as the received version identifier.

19. The SAS zoning expander of claim 18 wherein the controller is further adapted to determine which of the stored zone group permission table of the transmitting SAS zoning expander and the zone group permission table of the SAS zoning expander is current based on ordinal characteristics of the received version identifier and the version identifier if the version identifier is not the same as the received version identifier.

20. The SAS zoning expander of claim 18 wherein the controller is further adapted to synchronize the stored zone group permission table of the transmitting SAS zoning expander and the zone group permission table of the SAS zoning expander so that both are current.

21. The SAS zoning expander of claim 18 wherein the controller is further adapted to block SAS exchanges from the transmitting SAS zoning expander to the SAS zoning expander until the zone group permission table of the SAS zoning expander corresponds to the stored zone group permission table of the transmitting SAS zoning expander if the version identifier is not the same as the received version identifier.

22. The SAS zoning expander of claim 18 wherein the controller is further adapted to request from a SAS zoning expander supervisor a current version of the zone group permission table for the SAS domain if the version identifier of the SAS zoning expander is not the same as the received version identifier of the transmitting SAS zoning expander, and the controller is further adapted to update the zone group permission table of the SAS zoning expander to correspond to the current version of the zone group permission table.

* * * * *